Dec. 14, 1971   J. R. MOON   3,626,663
BLANKET FOR HORSES AND THE LIKE
Filed July 24, 1970
FIG. 1
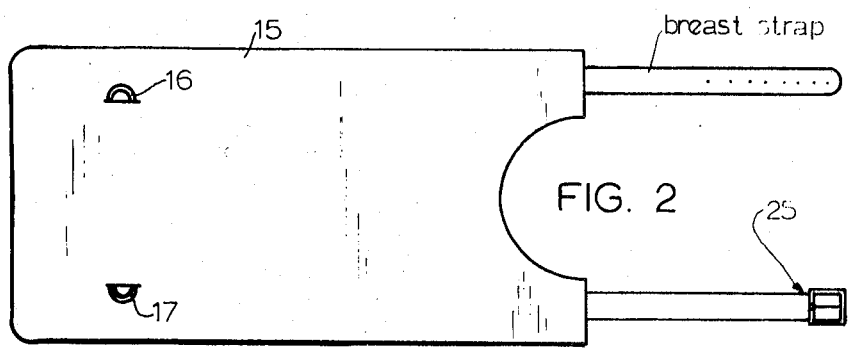
FIG. 2
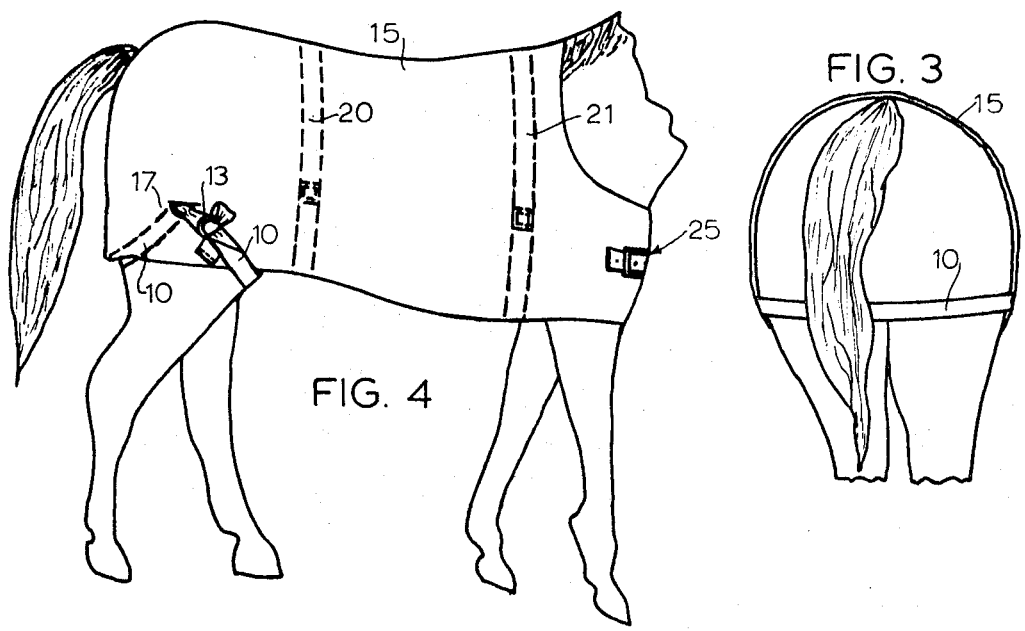
FIG. 3
FIG. 4
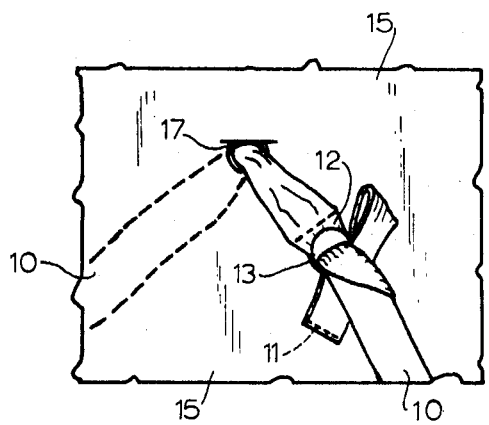
FIG. 5
INVENTOR.
Jacob R. Moon
BY
B. B. Olive.
ATTORNEY.

United States Patent Office 3,626,663
Patented Dec. 14, 1971

3,626,663
BLANKET FOR HORSES AND THE LIKE
Jacob R. Moon, St. Mary's Road, Box 642,
Hillsborough, N.C. 27278
Filed July 24, 1970, Ser. No. 57,925
Int. Cl. B68c 5/00
U.S. Cl. 54—79       5 Claims

ABSTRACT OF THE DISCLOSURE

A conventional horse blanket is modified by the elimination of the conventional non-stretchable body cinches and the substitution of a single stretchable strap slidably mounted in grommets placed in the lower rear portions of the blanket. The strap is formed of a seamless, stretchable tube adapted to embrace the hind legs of the horse.

BACKGROUND OF THE INVENTION (1) Field of the invention

This invention relates to horse blankets and particularly to straps and the like for stabilizing the blanket when on the animals.

(2) Description of the prior art

Horse blankets are normally retained by single thickness, nonstretchable, normally canvas or leather, banding cinches or straps which pass under the body of the horse and by a front breast strap. One horse blanket also uses a non-stretchable strap which is secured to the blanket and passes around each back leg of the animal. Such blanket straps or "stabilizers" have no facilities to give or stretch with the animals movement and in use tend to work off the animal's back and also cause severe rubbing.

In connection with a separate invention of an improved bandage for human and animal use as described in U.S. Pat. 3,504,672 the present applicant has discovered certain unique properties of a type of tubular knit fabric and which have adapted to the present invention. In general the teachings of the referred to prior art patent by the same inventor have been carried over into the present invention by providing a blanket stabilizer made of the same material as the bandage of the referred to patent.

SUMMARY OF THE INVENTION

The invention provides a much improved and less expensive blanket having a stabilizer or strap structure which fits many animal sizes, e.g. a horse and a pony, with a minimum material requirement and the stabilizer exhibits substantial elasticity and stretch in all directions. The stabilizer of the invention eliminates the need for body cinches and constitutes a single, relatively long strap preferably made of a seamless, rib knit tube formed of synthetic yarn, preferably nylon. The stabilizer provides a flat tube having one end closed by a seam and the other end portion fitted with a circular ring member. The free end of the stabilizer passes through a grommet eye which is made integral with the blanket. The flat tube portion is adapted to be passed around behind the hind legs and beneath the horses tail and then through a second grommet eye on the opposite side and then to be stretched and run beneath the body of the horse and up to the first grommet eye and through the ring where a knot is tied in the free end which secures the blanket in place. It has been found that such a tube when kept flat and employed as a stabilizer will exhibit stretch in all directions with greatly minimized slippage of the blanket.

An object is to provide an improved and less expensive animal blanket which incorporates a stabilizer which will not rub or chafe the animal's legs, which offers a minimum in restriction of movement and which will pull the blanket back in place when the animal relaxes and is not moving about.

A further object is to provide an improved animal blanket which has a stabilizer adapted to accommodate various animal sizes.

The foregoing and other objects will appear from the drawings and description to follow.

DESCRIPTION OF THE DRAWINGS

FIG. 1 is a plan view of the animal blanket stabilizer having a seam closing one end and a circular ring member made integral with the other end.

FIG. 2 is a plan view of an improved animal blanket showing the location of the opposed grommet members.

FIG. 3 is an end elevation view of a horse having a blanket and stabilizer according to the invention.

FIG. 4 is a side elevation view illustrating applicant's improved blanket and stabilizer and also illustrating the typical cinch type blanket stabilizers.

FIG. 5 is an enlarged fragmentary view of a portion of the blanket and one of the grommets and the circular ring member with the stabilizer secured by a slip knot.

DESCRIPTION OF THE PREFERRED EMBODIMENT

In the drawings, particularly FIG. 1, there is represented a blanket 15 and a seamless, rib knit, tube 10 having a sewn end 11 and a terminal end 12 to which is sewn a circular ring member 13. Tube 10 is knit on a dial and cylinder knitting machine and is formed with a multifilament, stretch ply all nylon yarn sold by the Madison Throwing Company of Madison, North Carolina and identified as 2/100/34 representing two ends, 100 denier and 34 filaments. This particular form of ply nylon when formed into a conventional rib knit tube exhibits substantially 100% longitudinal stretch and 300% lateral stretch. When heat processed, the fabric exhibits infinite way stretch. The infinite way stretch enables the stabilizer to follow the exact contour of the animal's body and the complete elasticity provides a soft responsive support that offers virtually no impediment to movement. The fabric is relatively lightweight and various lengths and widths may be employed. A rib knit all nylon seamless tube which measures when flat and relaxed 3 inches in width and 3 to 6 feet in length is generally suited for most stabilizer requirements and a wide range of horse and pony sizes. Such characteristics and lightweight characteristic has been discovered to be especially suited to use as animal blanket stabilizers and very surprisingly a single strap of this kind when fitted over the rear of the horse serves more effectively than the conventional pair of body cinches. While rib knit tubes of this same structure which have been knit and then heat tumbled at 165° F. for fifteen minutes to give the desired stretch characteristic are old in the art for apparel applications such as head gear bands, no one, so far as is known, has ever recognized the utility of this type fabric for blanket stabilizers.

It has also been found that a seamless rib knit tubular fabric, typical knitting being described in Volume 1. "Principles of Knitting," Chapter III by William E. Shinn, when made of stretch nylon will not shrink or lose its elasticity because of washing, is easily washed and dried, is exceptionally long wearing and can be reused. Furthermore, an ordinary household dryer can be employed to restore the soft stretch characteristic.

A further advantage of this invention is illustrated in FIG. 2 where the tube 10 is shown exhibiting perfect conformation to the rear of the animal. It may also be noted that the characteristic of stretch in all directions combined with the tube type rib fabric creates a unique elasticity which, in effect, flows with the movement of the animal's body thus reducing the probability of chafing.

As previously mentioned a surprising result of the invention is the fact that a single stabilizer or strap when fitted to a horse blanket and used with a conventional breast strap is more effective in keeping the blanket stabilized than is obtained by the ordinary body cinches indicated by numerals 20, 21 shown in dashed lines in FIG. 4. While excellent results can be obtained without employment of conventional body cinches 20, 21 it is contemplated that some horsemen may prefer to use both the stabilizer of the invention as well as the conventional body cinches. However, it is preferred that the expensive body cinches be eliminated.

To install the improved blanket and stabilizer, blanket 15 has a pair of grommets 16, 17 made integral with blanket 15. Grommets 16, 17 are located at predetermined places on lower opposed rear sides of blanket 15. To utilize the blanket stabilizer, the blanket 15 is first placed on the animal's back. The conventional breast strap 25 is secured. The single loose end 11 is then passed through the eye of grommet 17. Tube 10 is then passed around the animal's lower hind leg area somewhat beneath its tail. Tube 10 then is passed through the eye of grommet 16 beneath the body of the animal and through ring member 13 at which time a suitable slip or single bow knot is tied. During installation and in use care should be taken to maintain tube 10 flat against the animal's body. To remove blanket 51, the breast strap 25 is unstrapped and the knot in the stabilizer strap is untied which loosens tube 10 but without having to remove the stabilizer strap from the grommets. Blanket 15 can now be slid off to the rear of the animal. A skilled person who uses the improved blanket can install and remove the blanket in approximately one-third of the time normally required.

In actual field tests of a blanket and stabilizer construction made according to the invention the blanket has maintained its position on a horse put through as much as two weeks on pasture, and the combination of pasture and night stabling. During these tests horses have rolled from ten to twenty times. No substantial blanket displacement has been observed when the horse gets back on his feet. The single stretchable strap of the invention has readily accommodated to the various forces which assert themselves during such maneuvers and independent of any forces asserted by body cinches if employed. The blanket employed for these tests did not use any type of conventional non-stretchable body cinch. The single stretchable strap of the invention over the rear of the horse when used with a breast strap was found adequate. In a separate test for comparison the stretchable strap of the invention has been employed with conventional non-stretchable body cinches and a breast strap but with essentially no improvement in stabilization of the blanket. In fact conventional body cinches tend to keep a blanket mispositioned whereas the stabilizer of the invention effectively works to always restore the blanket to a proper position. Both vertical and horizontal give and take is provided and no conventional blanket has this characteristic.

I claim:

1. An animal blanket construction for horses and the like comprising:
   (a) a blanket adapted to loosely drape over selected top and side areas of the animal body and having in the left and right lower rear draped portions of the blanket defined opposite holes for receiving a stabilizing strap;
   (b) a breast strap secured to the front edges of said blanket; and
   (c) a stabilizing strap formed of a seamless knit tube having closed starting and terminal ends, said tube utilizing in its construction a stretchable stitch formation and multi-filament stretch ply synthetic yarns selected such that said tube is characterized by substantial longitudinal and lateral stretch, the length of said tube being selected such that said strap is adapted to pass through said holes and to include when installed on the animal body a first strectchable portion extending between said holes around the rear of the animal's hind legs beneath the tail and a second stretchable portion extending between said holes beneath and in front of the hind legs, said stretch character allowing said blanket in combination with the effect of said breast strap to remain substantially fixed in position during normal motions of the animal body while said portions give as required to accommodate such motions and without chafing or rubbing where said strap portions contact said body and independent of any forces asserted by any body cinches which may be present on said blanket.

2. An animal blanket structure as claimed in claim 1 wherein said holes are defined by grommets.

3. An animal blanket structure as claimed in claim 2 and including on said strap terminal end a ring member secured to said terminal end to facilitate the detachable securing together of said starting and terminal ends.

4. An animal blanket structure as claimed in claim 1 wherein said longitudinal stretch is substantially 100% and said lateral stretch is 300%.

5. An animal blanket structure as claimed in claim 4 wherein said synthetic yarns constitute stretch ply nylon yarns and said stitch formation constitutes a rib knit fabric.

References Cited
UNITED STATES PATENTS

| | | | |
|---|---|---|---|
| 177,809 | 5/1876 | Crittenden | 54—79 |
| 512,385 | 1/1894 | Mishler | 54—79 |
| 1,051,618 | 1/1913 | Murphy | 54—79 |
| 1,293,521 | 2/1919 | O'Brien | 54—79 |

HUGH R. CHAMBLEE, Primary Examiner